US010775877B2

(12) United States Patent
Mandalia et al.

(10) Patent No.: US 10,775,877 B2
(45) Date of Patent: Sep. 15, 2020

(54) SYSTEM TO GENERATE A MIXED MEDIA EXPERIENCE

(71) Applicant: ARRIS Enterprises LLC, Suwanee, GA (US)

(72) Inventors: Hiren M. Mandalia, Elk Grove Village, IL (US); Santosh S. Basapur, Hanover Park, IL (US); Shirley A. Chaysinh, Grayslake, IL (US); Narayanan Venkitaraman, Palatine, IL (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 575 days.

(21) Appl. No.: 13/857,567

(22) Filed: Apr. 5, 2013

(65) Prior Publication Data

US 2014/0289625 A1    Sep. 25, 2014

Related U.S. Application Data

(60) Provisional application No. 61/803,312, filed on Mar. 19, 2013.

(51) Int. Cl.
```
G06F 3/01       (2006.01)
G06F 16/40      (2019.01)
H04N 21/462     (2011.01)
```

(52) U.S. Cl.
CPC .............. *G06F 3/01* (2013.01); *G06F 16/40* (2019.01); *H04N 21/4622* (2013.01)

(58) Field of Classification Search
CPC ........... H04N 5/44543; H04N 21/4622; H04N 21/00; H04N 21/40; G11B 27/34; H04L 67/00; H04L 65/00; G06F 3/01; G06F 17/30017; G06F 17/00; G06F 17/30; G06F 16/7844; G06F 16/178; G06F 16/483; G06F 16/489; G06F 16/40; G06Q 30/00–02
USPC ........................................................ 715/716
See application file for complete search history.

(56) References Cited

U.S. PATENT DOCUMENTS

| | | | |
|---|---|---|---|
| 4,729,044 A * | 3/1988 | Kiesel | 386/281 |
| 6,289,165 B1 * | 9/2001 | Abecassis | G11B 19/02 |
| | | | 348/E5.105 |
| 6,317,795 B1 * | 11/2001 | Malkin | H04N 7/162 |
| | | | 345/619 |
| 7,512,886 B1 | 3/2009 | Herberger et al. | |
| 7,716,572 B2 | 5/2010 | Beauregard et al. | |
| 8,009,966 B2 | 8/2011 | Bloom et al. | |

(Continued)

FOREIGN PATENT DOCUMENTS

| | | |
|---|---|---|
| EP | 2209311 A1 | 7/2010 |
| WO | 2008/117926 A1 | 10/2008 |
| WO | 2011/097405 A1 | 8/2011 |

OTHER PUBLICATIONS

PCT Search Report, Re: Application #PCT/US2014/031182; dated Aug. 8, 2014.

(Continued)

*Primary Examiner* — Daniel Samwel
(74) *Attorney, Agent, or Firm* — Wenderoth, Lind & Ponack, L.L.P.

(57) ABSTRACT

Segments of plural media expressions of a narrative are defined and linked by metadata enabling substitution of a segment of one medium expression of the narrative for a segment of another medium expression the narrative when requested by a user.

18 Claims, 13 Drawing Sheets

(56) References Cited

U.S. PATENT DOCUMENTS

| | | | |
|---|---|---|---|
| 8,972,265 B1* | 3/2015 | Lester | G10L 13/00 704/246 |
| 2002/0078144 A1* | 6/2002 | Lannkin | G06F 21/10 709/203 |
| 2003/0046638 A1* | 3/2003 | Thompson | G11B 27/105 709/231 |
| 2005/0042591 A1* | 2/2005 | Bloom | G11B 27/034 434/307 A |
| 2007/0106516 A1* | 5/2007 | Larson | G10L 13/033 704/270 |
| 2009/0300699 A1* | 12/2009 | Casagrande | H04N 5/76 725/116 |
| 2010/0209003 A1 | 8/2010 | Toebes et al. | |
| 2010/0325657 A1* | 12/2010 | Sellers | H04N 21/23424 725/32 |
| 2011/0106970 A1 | 5/2011 | Song et al. | |
| 2011/0200116 A1* | 8/2011 | Bloch et al. | 375/240.25 |
| 2011/0231474 A1* | 9/2011 | Locker | G10L 15/26 709/203 |
| 2012/0041954 A1* | 2/2012 | Curtis et al. | 707/740 |
| 2012/0158706 A1* | 6/2012 | Story, Jr. | G06F 16/248 707/723 |
| 2012/0216121 A1* | 8/2012 | Lin | H04N 21/23432 715/721 |
| 2012/0324324 A1 | 12/2012 | Hwang et al. | |
| 2012/0330756 A1* | 12/2012 | Morris | G06Q 50/01 705/14.66 |
| 2013/0124664 A1 | 5/2013 | Fonseca, Jr. et al. | |
| 2013/0125188 A1 | 5/2013 | Mandalia et al. | |
| 2013/0132521 A1 | 5/2013 | Fonseca, Jr. et al. | |
| 2013/0144725 A1 | 6/2013 | Li et al. | |
| 2013/0198602 A1* | 8/2013 | Kokemohr | G06F 17/30011 715/233 |
| 2013/0212454 A1* | 8/2013 | Casey | G06F 17/2288 715/203 |
| 2013/0212611 A1* | 8/2013 | Van Aacken | H04N 21/2547 725/23 |
| 2013/0246567 A1* | 9/2013 | Green | H04L 67/06 709/217 |
| 2013/0268826 A1* | 10/2013 | Nowakowski | G06F 17/2288 715/203 |
| 2013/0287365 A1 | 10/2013 | Basapur et al. | |
| 2013/0290488 A1 | 10/2013 | Mandalia et al. | |
| 2013/0290859 A1 | 10/2013 | Venkitaraman et al. | |
| 2013/0290892 A1 | 10/2013 | Basapur et al. | |
| 2013/0298179 A1 | 11/2013 | Baum et al. | |
| 2013/0346414 A1 | 12/2013 | Smith et al. | |
| 2013/0346631 A1 | 12/2013 | Gandhi et al. | |
| 2013/0347017 A1 | 12/2013 | Li et al. | |
| 2013/0347057 A1 | 12/2013 | Hurwitz et al. | |
| 2014/0009476 A1 | 1/2014 | Venkitaraman et al. | |
| 2014/0028917 A1 | 1/2014 | Smith et al. | |
| 2014/0089967 A1 | 3/2014 | Mandalia et al. | |
| 2014/0095608 A1 | 4/2014 | Mandalia et al. | |
| 2014/0098293 A1 | 4/2014 | Ishtiaq et al. | |
| 2014/0176604 A1 | 6/2014 | Venkitaraman et al. | |
| 2014/0181160 A1 | 6/2014 | Novak et al. | |
| 2014/0281989 A1* | 9/2014 | Clark | G06F 3/0484 715/717 |
| 2014/0289622 A1* | 9/2014 | Riggs | G06F 3/01 715/716 |

OTHER PUBLICATIONS

PCT Search Report, Re: Application #PCT/US2014/031177; dated Aug. 14, 2014.

A. Ghandar, et al "Pattern Puzzle: A Metaphor for Visualizing Software Complexity Measures", APVis '06 Proceedings of the Asia-Pacific Symposium on Information Visualization, vol. 60, Feb. 1-3, 2006, pp. 221-224.

F. Ritter, et al., "Using a 3D Puzzle as a Metaphor for Learning Spatial Relations", In Proceedings of Graphics Interface, 2000 pp. 171-178.

Amazon Whispersync UI, retrived from URL <http://www.amazon.com/gp/help/customer/display.html/ref=sr_1_1_acs_h_1?ie=UTF8&nodeId=200911660&qid=1405085994&sr=8-1-acs> on Jul. 11, 2014.

"Automatic Mashup Generation of Multiple-camera Videos", Philips Electronics N.V. 2009, 165 pgs.

Official Action, Re: Canadian Application No. 2,912,324, dated Dec. 15, 2016.

Official Action, Re: Korean Application No. 10-2015-7028699, dated Jun. 8, 2017.

Official Action, Re: Mexican Application No. MX/a/2015/012408, dated Oct. 2, 2017.

EPC Examination Report, RE: Application No. 14724874.4, dated Oct. 13, 2017.

Official Action, Re: Korean Application No. 10-2015-7028699, dated Aug. 16, 2016.

Official Action, RE: Canadian Application No. 2,912,324, dated Dec. 12, 2017.

Official Action, RE: Chinese Application No. 201480016884.8, dated Jan. 23, 2018.

Official Action, RE: Mexican Application No. MX/a/2015/012408, dated Mar. 22, 2017.

Official Action, RE: Korean Application No. 10-2015-7028699, dated Mar. 31, 2017.

Official Action, Re: Mexican Application No. MX/a/2015/012408, dated Mar. 5, 2018.

Official Action, RE: Mexican Application No. MX/a/2015/012408, dated Jul. 11, 2018.

* cited by examiner

```xml
<xml>
    <story_id> 93 </story_id>
    <story_title> "Romeo and Juliet" </story_title>
        •
        •
        •
    <map_items>
        <item>
            <segment>
                <media_type>audio</media_type>
                <start> 5:10 </start>
                <end>  7:32 </end>
                <version_id>32</version_id>
            </segment>
            <segment>
                <media_type>video</media_type>
                <start> 3:32 </start>
                <end>  10:02 </end>
                <version_id>72</version_id>
            </segment>
        </item>
    </map_items>
</xml>
```

```xml
<xml>
    <story_id> 93 </story_id>
    <story_title> "Romeo and Juliet" </story_title>
    <segment>
        <media_type>audio</media_type>
        <order> 1 </order>
        <start> ... </start>
        <end> ... </end>
    </segment>
    <segment>
        <media_type>video</media_type>
        <order> 2 </order>
        <start> ... </start>
        <end> ... </end>
    </segment>
    •
    •
    •
</xml>
```

SYSTEM TO GENERATE A MIXED MEDIA EXPERIENCE

CROSS-REFERENCE TO RELATED APPLICATION

Related subject matter is disclosed in the following patent application, which is commonly owned and co-pending with the present application, and the entire contents of which are hereby incorporated by reference: U.S. patent application Ser. No. 13/857,550, filed herewith, titled "INTERACTIVE METHOD AND APPARATUS FOR MIXED MEDIA NARRATIVE CONSUMPTION".

BACKGROUND

The present invention relates to a system for generating a mixed media narrative presentation.

Narratives or stories are commonly available for electronic presentation on a computing device, such as a laptop or tablet computer or a cellular phone, and are increasingly available in more than one medium of expression. For example, a narrative may be available as an electronic book (e-book), an audio book, a video, a television program and/or a comic strip/book, a group of cartoons arranged in a narrative sequence. Typically, an entire narrative will be presented in a single, consumer selected medium, for example, an audio book. However, with increased availability of narratives in differing mediums of expression, interest in comparing a narrative or a portion of a narrative when presented in different media or in experiencing a multi-media presentation of a narrative has increased.

BRIEF DESCRIPTION OF THE DRAWINGS

FIG. 9 is exemplary program data enabling a user interface for a mixed media narrative presentation, in accordance with an embodiment.

FIG. 10 is exemplary program data enabling presentation of segments of a mixed media narrative in an order and version selected by the user, in accordance with an embodiment.

DETAILED DESCRIPTION

A narrative or story may be expressed in one or more media. For examples, narratives are commonly expressed as a video, an electronic book (e-book), an audio book, a television program and/or comic book/strip, a group of cartoons arranged in a narrative sequence. In embodiments, a method and apparatus are provided for presenting a narrative comprising portions presented in respective user selectable medium(s) of expression.

An embodiment provides a system for presenting a mixed media narrative comprises a memory storing data accessible by a data processing unit, the data including a segment of a first medium expression of a narrative and a segment of a second medium expression of the narrative and data identifying the segment of the first medium expression as substitutable for the segment of the second medium expression; and a data processing unit arranged to access the data stored in the memory and present the segments of the narrative to a user, the data processing unit presenting the segment of the first medium expression to the user during a presentation of the second medium expression if a preference is expressed by the user preference for the first medium expression and if data in the memory identifies the segment of the first medium expression as substitutable for the segment of the second medium expression.

A further embodiment provides an apparatus for presenting mixed media narratives comprising a media reconciler arranged to define segments of a first medium expression of the narrative and to define segments of a second medium expression of the narrative; a media interchange linker arranged to analyze the segments of the first medium expression and the segments of said second medium expression and, if a segment of the first medium expression is substitutable for a segment of the second medium expression, to associate a data with the segment of the first medium expression indicating that the segment of the second medium expression is substitutable for the segment of the first medium expression; and a data processing unit to present to a user, during a presentation of the first medium expression of the narrative, the segment of the second medium expression if the second medium expression is selected by the user and the data indicates that the segment of said second medium expression is substitutable for the segment of the first medium expression.

A still further embodiment provides a method for presenting a mixed media narrative includes presenting a first segment of a first medium expression of the narrative to a user; and presenting a first segment of a second medium expression of the narrative to the user if the user signals a preference for the second medium expression and if the first segment of the second medium expression is substitutable for a second segment of the first medium expression of the narrative.

Figure 1:
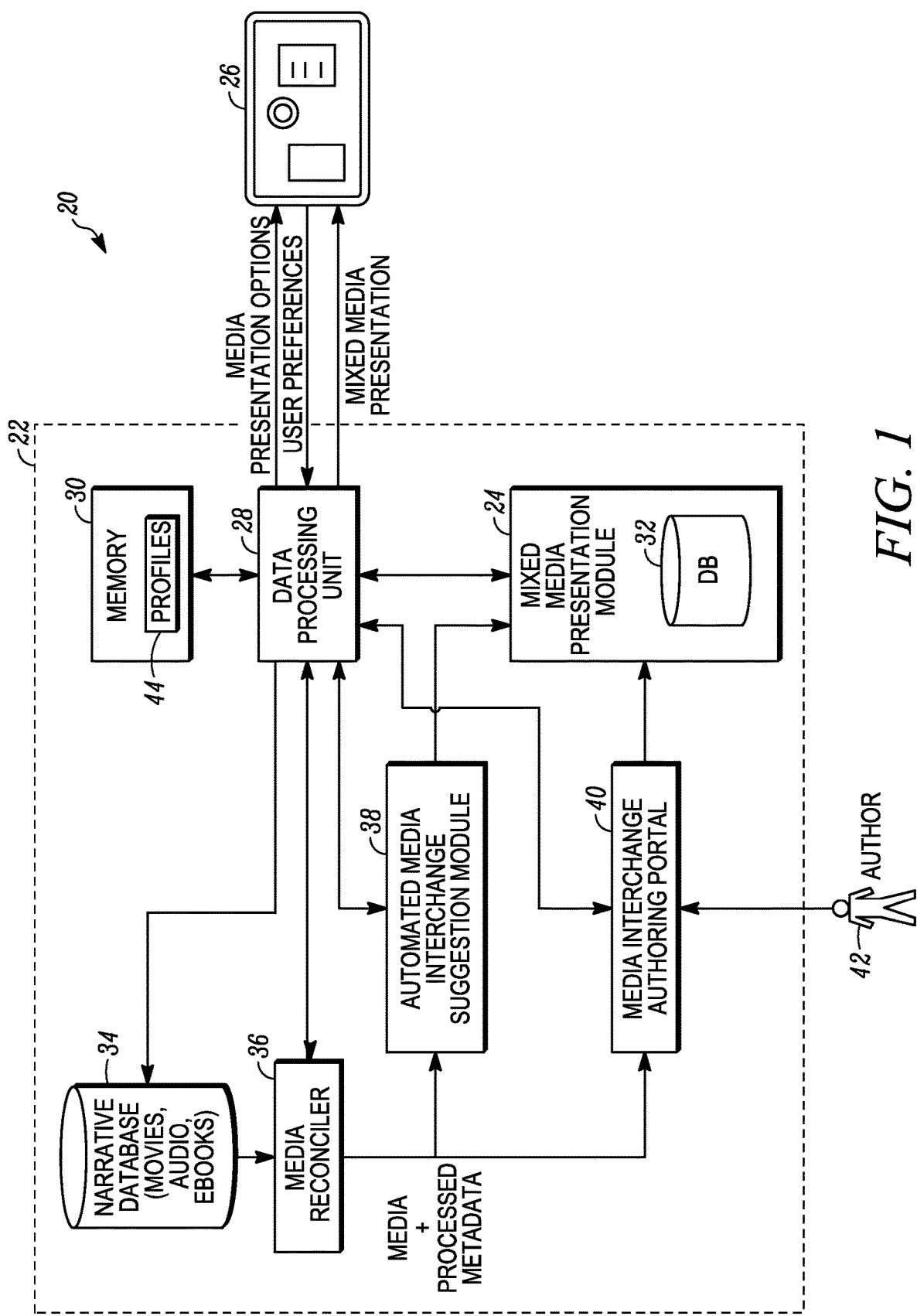
FIG. 1 is a block diagram of a mixed media presentation system, in accordance with an embodiment.

Referring in detail to the drawings where similar parts are identified by like reference numerals, and, more particularly to FIG. 1, a mixed media narrative presentation system 20 comprises, generally, a mixed medium presentation system 22, including a mixed media presentation module 24, communicatively connectable to a user's computing device 26 which may comprise, by way of examples only, a laptop computer, a tablet computer or a cellular telephone. The mixed media presentation system 22 includes a data processing unit 28 arranged to execute programs according to a set of program instructions and data stored in a memory 30. The data processing unit 28 is arranged to communicate with remote computing devices, such as the user's computing device 26 and to communicate with a mixed media presentation memory 32 of the mixed media presentation module 24 in which segments of one or more narratives in one or more mediums of expression are stored.

Figure 2:
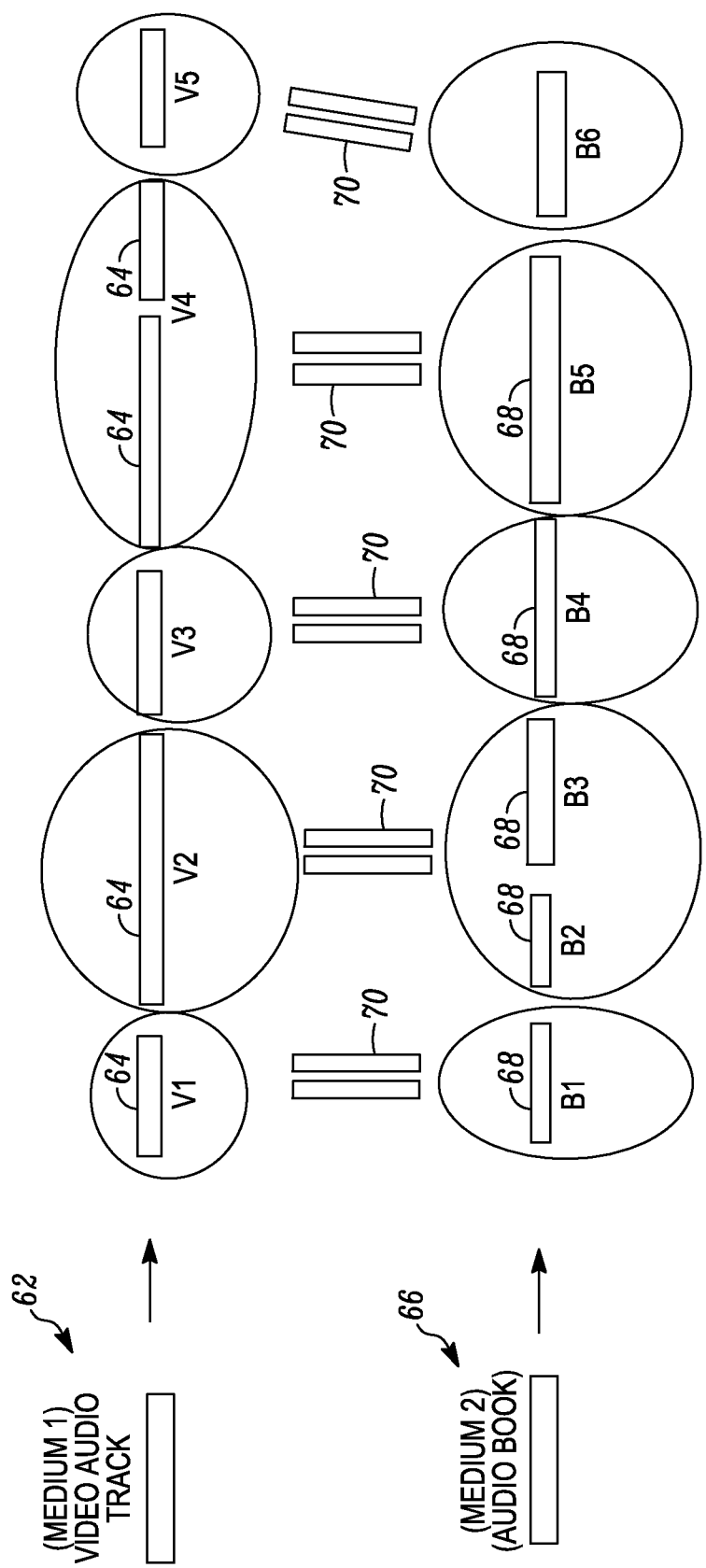
FIG. 2 is a block diagram of a process of segmenting and linking segments of a narrative as expressed in two mediums, in accordance with an embodiment.

A narrative commonly comprises a sequence of narrative segments. For example, a digital video typically comprises a plurality of sequential scenes, each comprising a succession of frames or images and an audio track which may include dialogue, music and sound effects. Books, in either text or audio form, commonly comprise a series of chapters, each, typically, comprising a plurality paragraphs each of which, in turn, comprises one or more sentences including topic and supporting sentences and dialogue. Referring also to FIG. 2, in the mixed media narrative presentation system 22, an expression of a narrative, for example a video, is stored in a narrative data base 34. The data processing unit 28 directs the recovery of a narrative expression; for example, medium 1, an audio track of video 62; from the narrative data base 34 and transmits the narrative expression to a media reconciler 36. The media reconciler 36 defines a succession of segments 64, for example, video audio track segments 62, making up the narrative expression and associates metadata with each segment identifying and describing the segment. Similarly, the media reconciler might segment the scenes of a video or the scenes of an image portion of a video or the topic and background sentences and dialogue of an audio book or an e-book.

In the mixed media presentation system 22, the segmented narrative expression may be transmitted to either an automated media interchange suggestion module 38 or a media interchange authoring portal 40. In the automated media interchange suggestion module 38 the data processing unit 28 analyzes the segments of plural medium expressions, for examples, segments 64 of the first medium expression 62 of the narrative and the metadata describing the respective segments, and compares the segments of the first medium expression to respective segments 68 and associated metadata of the second medium expression 66, for example an audio book, to determine which segments of the first medium expression are substitutable for the segments of the second medium expression. The automated media interchange suggestion module adds metadata 70 to each segment of the plural expressions of the narrative linking a segment 64 of the first expression 62 to one or more corresponding segments 68 of the narrative in the second medium expression 66 and vice versa. For example, segments of a video audio track containing a character's dialogue may be linked to segments of an audio book or an e-book where the character is quoted enabling substitution of the video actor's dialogue for the narrator's dialogue or the text expressing a character's dialogue. The system provides plural levels of granularity enabling mapping and substitution of dialogue in differing media expressions of the narrative, such as substitution of a scene from one video expression for a scene of a second video expression or linking of a video scene or image or sound effect to a chapter or a paragraph of an e-book or an audio book permitting simultaneous presentation of a video scene or image while the audio or sound effect is output or the e-book text is presented on a second or a divided display.

In the media interchange authoring portal 40, an author 42 interested in developing a mixed medium narrative may manually segment a narrative and/or add metadata 70 linking segments of an expression of a narrative to the segments of a second expression of the narrative which has been segmented and stored in the mixed media presentation system's memory.

Figure 7:
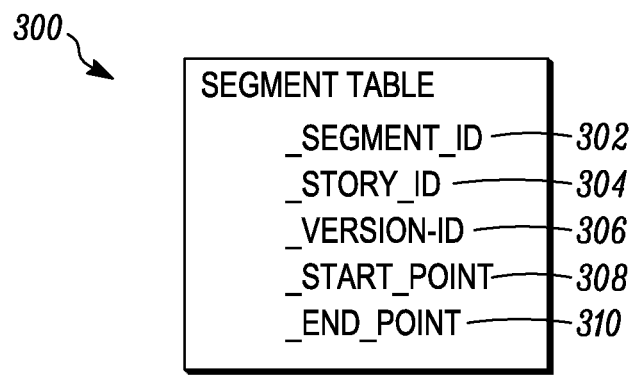
FIG. 7 is an exemplary segment table for identifying a segment of a narrative, in accordance with an embodiment.
Figure 8:
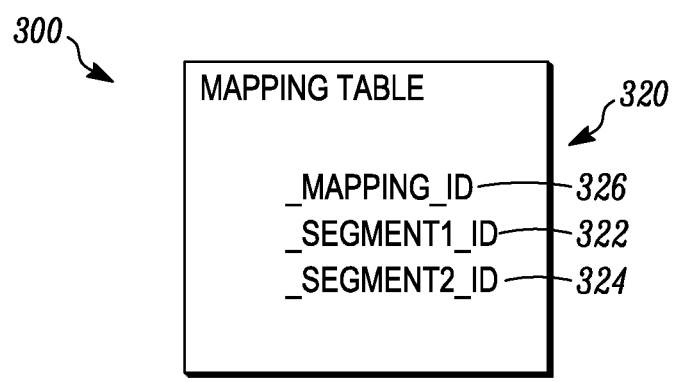
FIG. 8 is an exemplary mapping table for identifying the linkage of narrative segments, in accordance with an embodiment.

When the segments of the plural expressions of a narrative have been linked in either the automated media interchange suggestion module 38 or the media interchange authoring portal 40, the segmented narratives including the segment descriptive metadata linking the segments of the different media expressions are stored in the mixed media presentation module database 32. Referring also to FIG. 7, the segments of each medium expression of a narrative are stored in the mixed media presentation module database 32 as a record in a segment table 300. Each record in the exemplary segment table 300 represents a segment of one medium expression of the designated narrative or story and may include a segment identification 302, a narrative identification 304, a version or medium identification 306, a start point 308 and an end point 310. Referring also to FIG. 8, a mapping table 320 stored in the mixed media presentation module database maps the relationship between any two segments 322, 324 stored in the database with a mapping identification 326.

Figure 3:
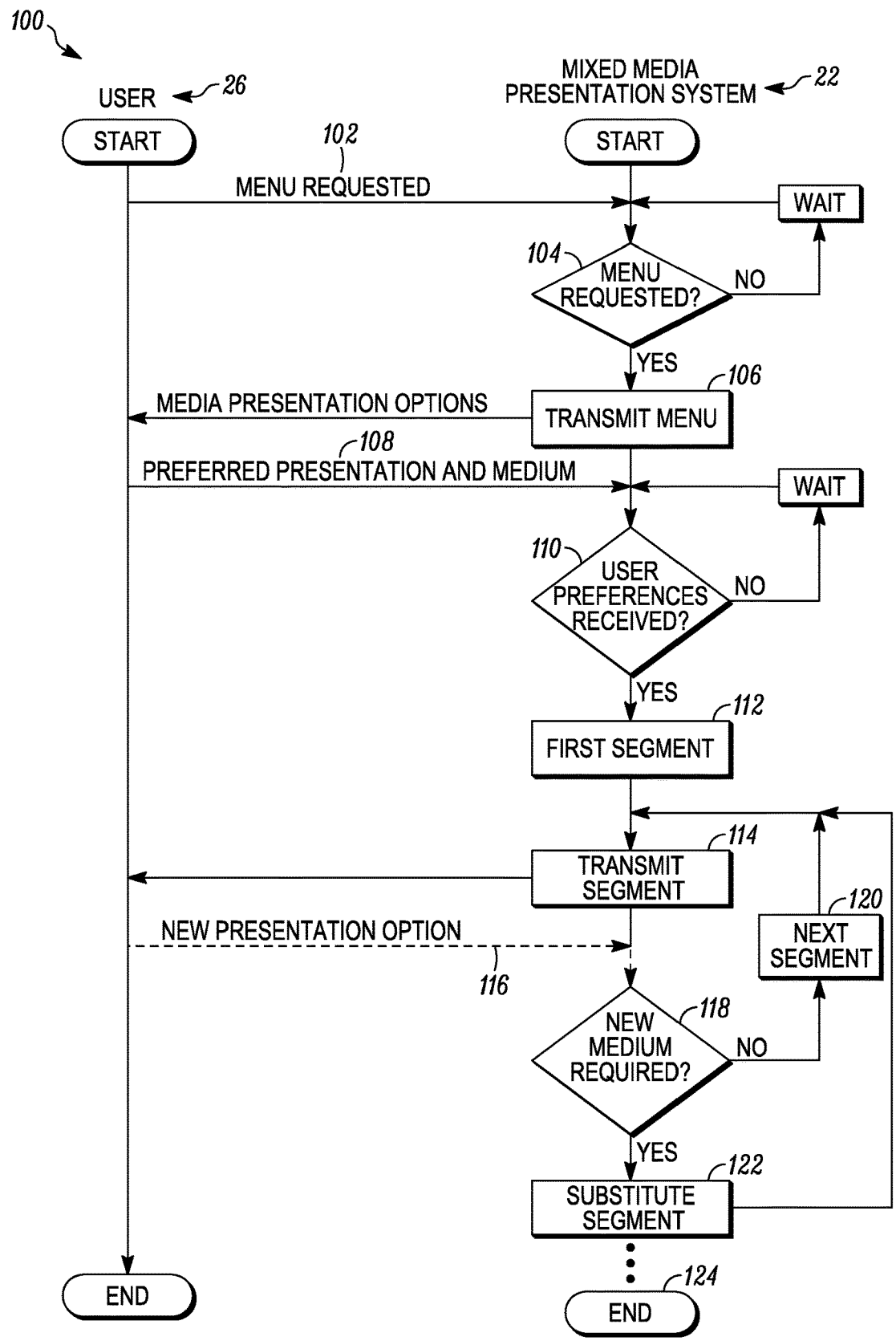
FIG. 3 is a flow diagram of a mixed media narrative presentation process, in accordance with an embodiment.
Figure 4:
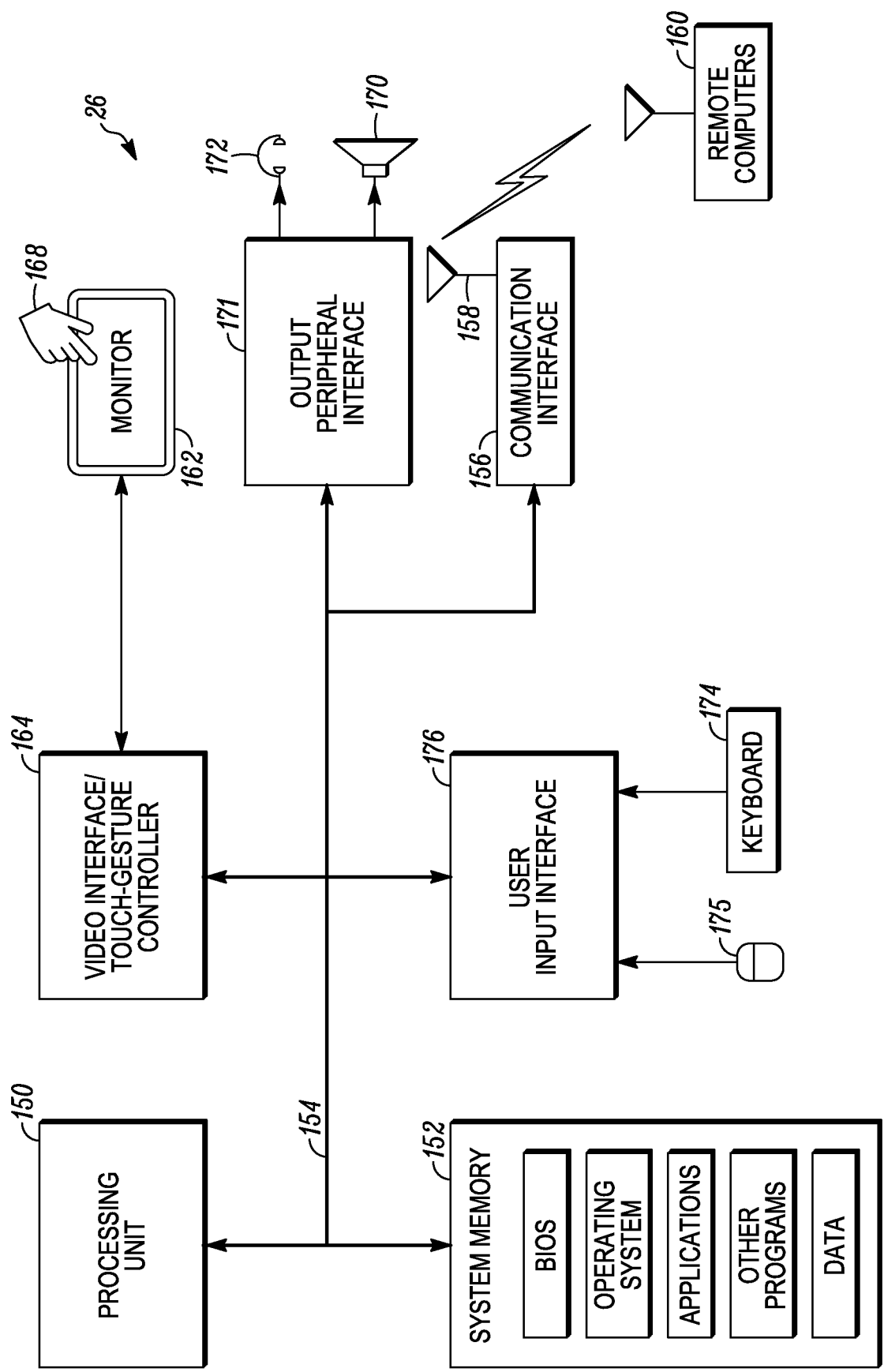
FIG. 4 is a block diagram of an exemplary user's computing device for presenting a mixed media narrative, in accordance with an embodiment.

Referring also to FIG. 3, a mixed media narrative presentation 100 typically begins with a request for a menu of available narratives and media transmitted 102 from a user's computing device 26 to the data processing unit 28 of the mixed media presentation system 22. Referring also to FIG. 4, a user's computing device 26 may be any computing device capable of communicating with the mixed media presentation system 22 and presenting a narrative to the user in one or more mediums of expression selected by the user. By way of examples only, the user's computing device might be a laptop computer, a tablet computer, a mobile phone, television or an e-book reader. The user's computing device 26 comprises, generally, a processing unit 150, a system memory 152 and a system bus 154 that couples the various components of the computing device, including the system memory, to the data processing unit.

The system memory 152 may include nonvolatile and/or volatile computer accessible storage media which may be implemented in any method or technology suitable for storing computer-readable information, such as computer readable instructions, data structures, program modules, narrative data or other data. Computer storage media includes, but is not limited to, random access memory (RAM); read-only memory (ROM); EEPROM; flash memory; optical storage, such as digital versatile disk (DVD), and magnetic storage devices. A basic input/output (BIOS) system containing basic routines that aid in transferring information between elements within the computing device, such as, during start-up, is typically stored in non-volatile memory. Data and/or program modules, such as an operating system and application programs and data, are also typically stored in non-volatile memory, such as flash memory or magnetic disk storage, but may be copied to volatile memory, such as RAM, for immediate accessibility and/or utilization by the processing unit.

The user's computing device 26 also typically includes a communication interface 156, and can comprise communication media embodying computer-readable instructions, data structures, program modules or other data. Information may be communicated, for example, using a modulated data signal having one or more characteristics changeable in a manner to encode information in the signal, such as a carrier wave or other data transport medium. By way of example, but not limitation, communication media includes wired media such as a wired network or a direct-wired connection and wireless media such as acoustic, radio frequency (RF) 158, infrared and other wireless media or any combination of computer readable communication media.

Typically, the user's computing device includes a monitor or other display device 162 for visually presenting data, including video and text data, to the user. The display is commonly connected to the processing unit via a video interface 164. In addition, the user's computing device 26 commonly incorporates an audio output device, such as a speaker 170 and/or headphones 172 interconnected to the system bus by an output peripheral interface 171. A user may enter commands and information into the computing device through one or more input devices such as keyboard 174 or a pointing device 175, such as a mouse, trackball or touch pad, a microphone or a game pad, which is connected to the processing unit by an input device interface 176. The user's computing device may also comprise a virtual input mechanism such as a virtual keyboard or pointing device operated by touch, stylus or gesture interaction 168 with the monitor 162 and in communication with the data processing unit 156 by a touch/gesture controller which may, for example, be part of the video interface 164.

Figure 11:
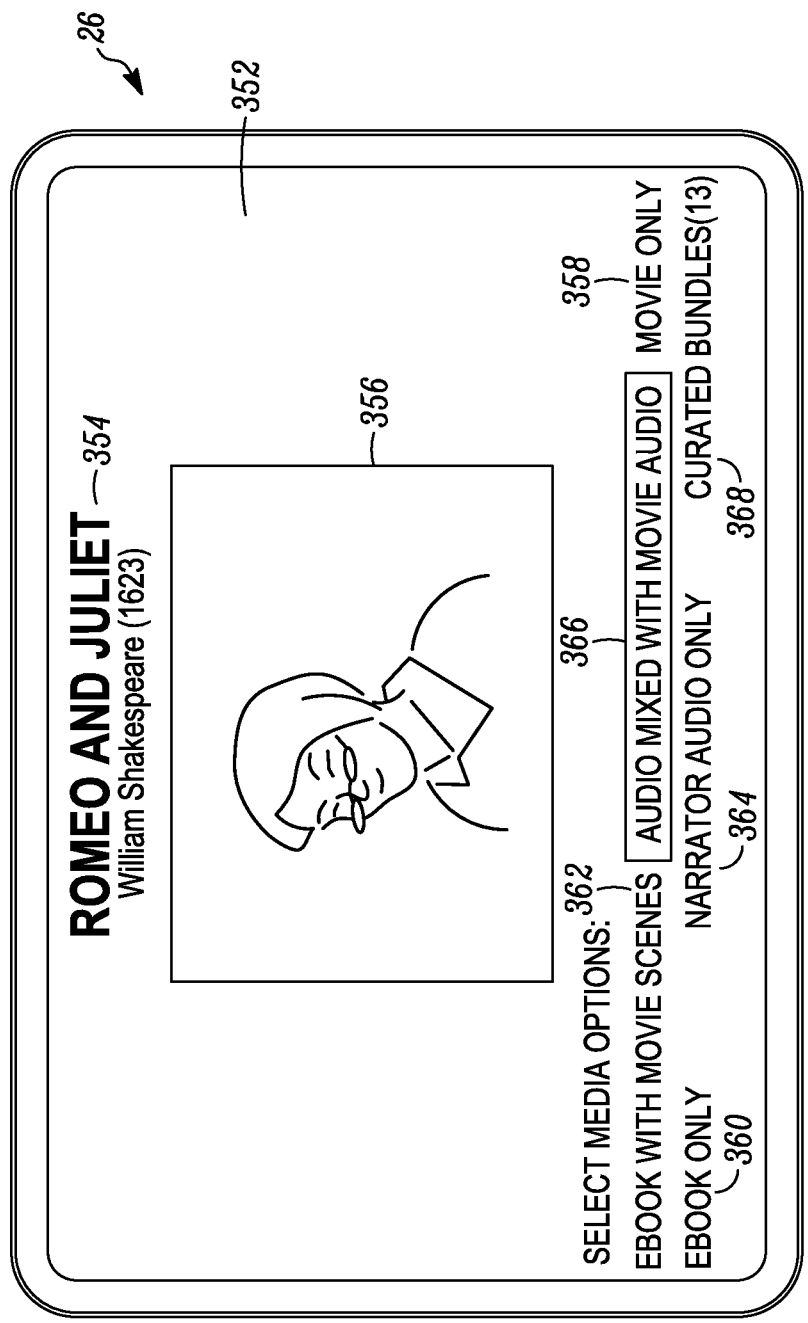
FIG. 11 is an exemplary interface for a computing device enabling selection of differing modes of presentation for a mixed media narrative, in accordance with an embodiment.
Figure 12:
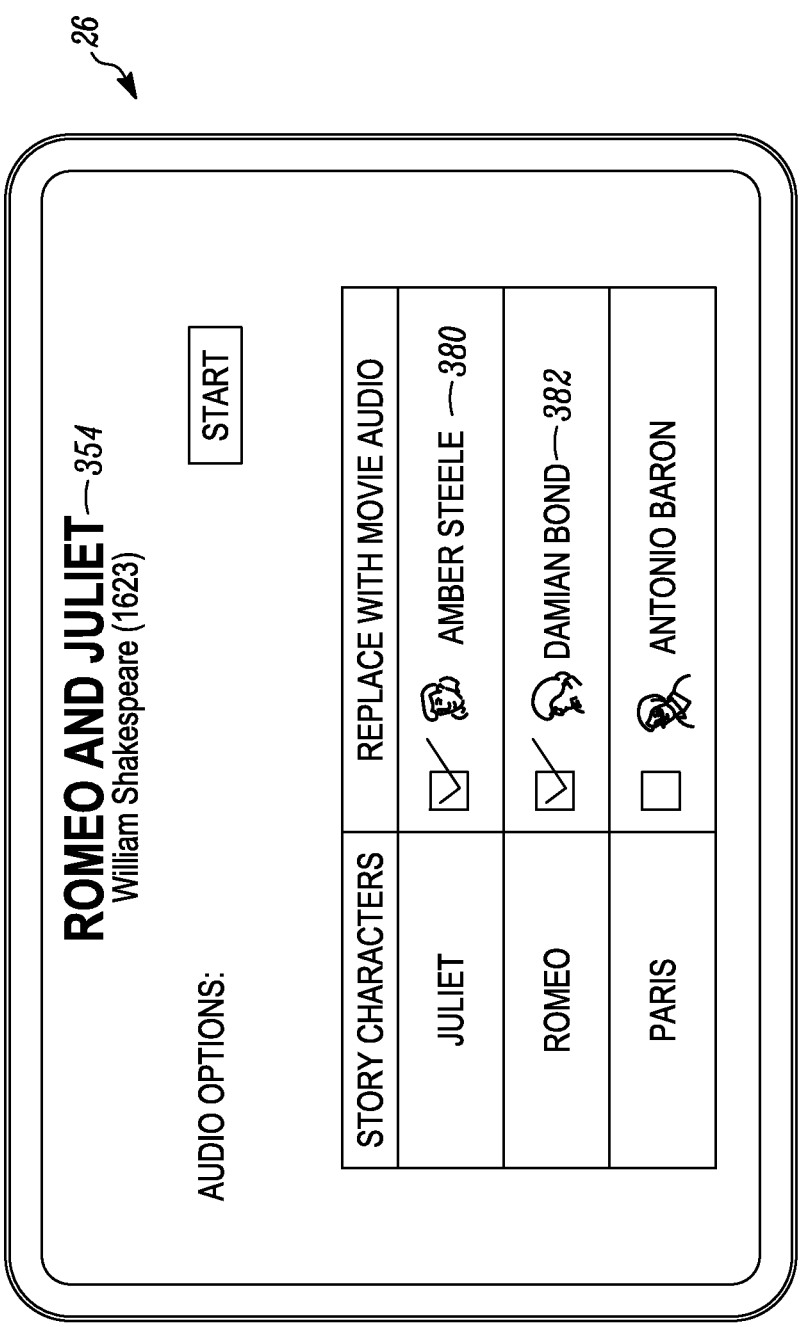
FIG. 12 is an exemplary interface for a computing device enabling selection of specific classes of segments within a medium of expression, in accordance with an embodiment.

When the user inputs a command to the user's computing device 26 requesting a menu of available narratives, the request is transmitted 102 to the data processing unit 28 of the mixed media presentation system 22 by the communication system interconnecting the two devices. Referring also to FIGS. 9, 10 and 11, in response to the request 104, the data processing unit 28 of the mixed media presentation system 22 transmits 106 program data 340, 342 to the user's computing device which is parsed by the user's computing device 26 to create an user interface, for example the user interface 352, presenting the user with a menu of available narratives and options for interchanging segments of one medium expression of a narrative for segments of a second medium expression of the narrative. The user interface may identify a narrative 354 and include a representation from one of the available medium expressions, such as an image 356 from a video, suggesting the content of the narrative. If available for the desired narrative, the user might, by way of examples, elect presentation of a video 358, an e-book 360 or an e-book which includes scenes from the video expression 362 of the narrative; an audio book 364 or an audio book mixed with audio from a video 366 or a package of segments that have been bundled according to the user's profile or a profile of a group of users 368. Further, referring also to FIG. 12, when the user selects a presentation option, the interface may present additional options enabling the user to explore the granularity of the narrative presentation. For example, the user may select certain groups or classes of segments within a medium expression, for example, only the segments representing certain characters or speakers 380, 382 in an audio track as preferred substitutes for the narrator of an audio book.

From the menu of available narratives and narrative expressions presentable on the user's computing device, the user can select a preferred narrative and medium of expression to be presented. The user preference for a narrative and a medium of expression is transmitted 108 from the user's computing device to the data processing unit 28 of the mixed media presentation system 22 and stored in the mixed media presentation system memory 30. Alternatively, a user profile 44 including media preferences previously selected by the user may be stored in the memory 30 of the mixed media presentation system 22 or stored on the user's computing device for transmittal to the mixed presentation system when the user requests a menu of available narrative expressions. In addition, statistical information related to media interchanges requested by past users or groups of users, such as social media associates of the user, of a narrative may be stored in the memory of the mixed media presentation system and presented to a user as a graphic or other representation of the popularity of a particular preference, for example, as a heat map, enabling the user select more commonly requested segments and media when a narrative is presented.

Referring also to FIG. 10, when the user preferences are received by the mixed media presentation system 110, the data processing unit 28 recovers the requested segment of the narrative in the preferred medium of expression from the memory 32 of the mixed media presentation module 24 and transmits program data 342 enabling presentation of the segments of the narrative in the versions and order selected by the user and the segment, for example, the first segment of the narrative, to the user's computing device 114 for presentation to the user. The data processing unit 28 of the mixed media presentation system determines whether a new presentation option 116 has received from the user's computing device 26 and whether the new presentation option includes a request for a different medium expression of the narrative 118. If the narrative is being presented to the user as an ordered sequence of segments, and a new medium has not been requested 118, the data processing device 28 recovers the next segment in the current medium expression of the narrative 120 and transmits the next segment to the user 114. However, if a new medium has been requested by the user's computing device 118, the data processing unit 26 of the mixed presentation system 22 examines the metadata associated with the next segment of the current medium expression of the narrative and the metadata associated with one or more segments of the new medium expression to find one or more segments of the new medium expression which are substitutable the next segment of current medium expression 122. Alternatively, the data processing unit might determine the identity of and transmit a segment of the new medium expression that is substitutable for the last segment of the current medium expression that was transmitted. As a further alternative, if requested the mixed media presentation system might retransmit a segment of a narrative enabling a replay of a segment of the narrative. The mixed media presentation system continues to transmit segments of the narrative expressed in the medium requested by the user's computing device until the end of the narrative has been reached or the user's request for segments has been satisfied 124.

Figure 5:
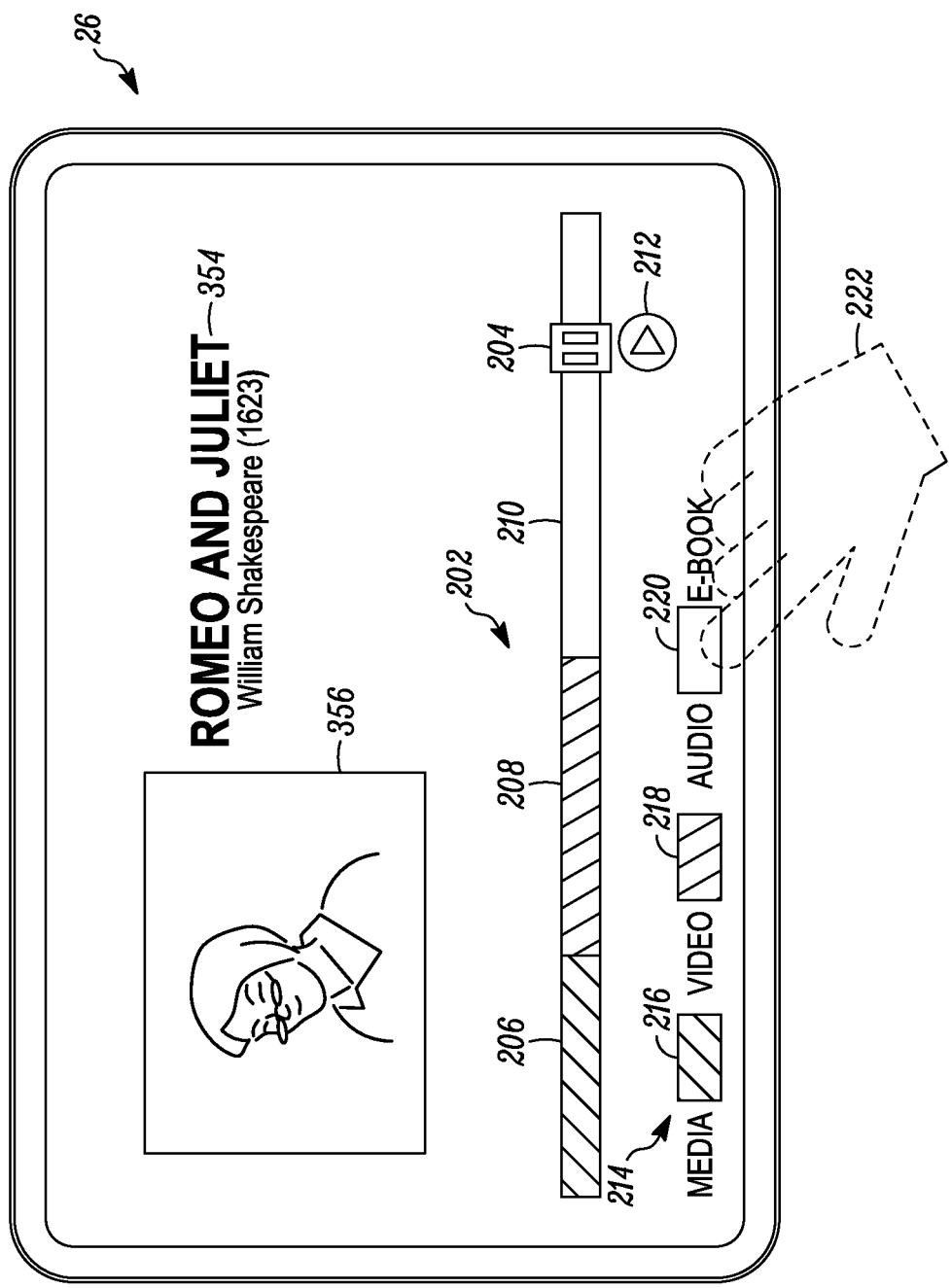
FIG. 5 is a front view of a user's computing device displaying a first embodiment of an interactive user interface for a mixed medium narrative presentation, in accordance with an embodiment.

In an embodiment, a mixed media experience would be improved by a novel interactive user interface for the user's computing device 26 enabling a user to monitor and control the progress of a mixed media narrative presentation and enabling the user to select the media in which portions of the narrative are presented. Referring to FIG. 5, a first embodiment of the mixed media interface 200 includes a progress bar 202 including a progress icon 204 indicating the progress in a narrative's presentation. In addition, the progress bar 202 indicates the medium(s) in which the narrative is and has been presented. For example, the exemplary progress bar 202 indicates that an initial portion 206 of the narrative was presented as a video, followed by a second portion of the narrative 208 presented as an audio book, which was, in turn, followed by a portion 210 which was presented as an e-book. A user selectable presentation icon 212 controls the progress of the presentation and indicates whether the presentation of the narrative is proceeding or, as illustrated, has been halted.

The mixed media user interface 200 also includes a media selector 214. When the user's computing device 26 receives a segment of the narrative from the mixed media presentation system 22, the narrative segment may be accompanied by metadata describing the presentation options, including the available media expressions, for the next segment of the narrative. The media selector 214 displays the medium expression options, for example, video 216, audio 218 and e-book 220 for the next narrative segment. The user may select a new medium expression for the next narrative segment by selecting one of the available medium expression options, for example, by touching 222 a portion of the monitor displaying the desired one of the available media options. Alternatively, the mixed media presentation module may recover a segment of the narrative in the new medium of expression that is substitutable for the segment being presented and transmit that segment to the user's computing device for presentation after completion of the presentation of the current segment or the segments of plural media expressions may be presented simultaneously on differing output devices of the user's computing device, for examples, audio and video may be simultaneously presented with a display and speakers or text and images may be presented simultaneously on two displays or a display divisible into plural windows. In this case, the media selector indicates the media options for the segment that is being currently presented. The mixed media presentation module continues to recover successive segments of the narrative from memory in the user selected medium of expression and transmit those segments to the user's computing device until the user selects another medium of expression or interrupts the presentation by selection of the presentation icon 212 or until the last segment of the narrative has been presented.

Figure 6:
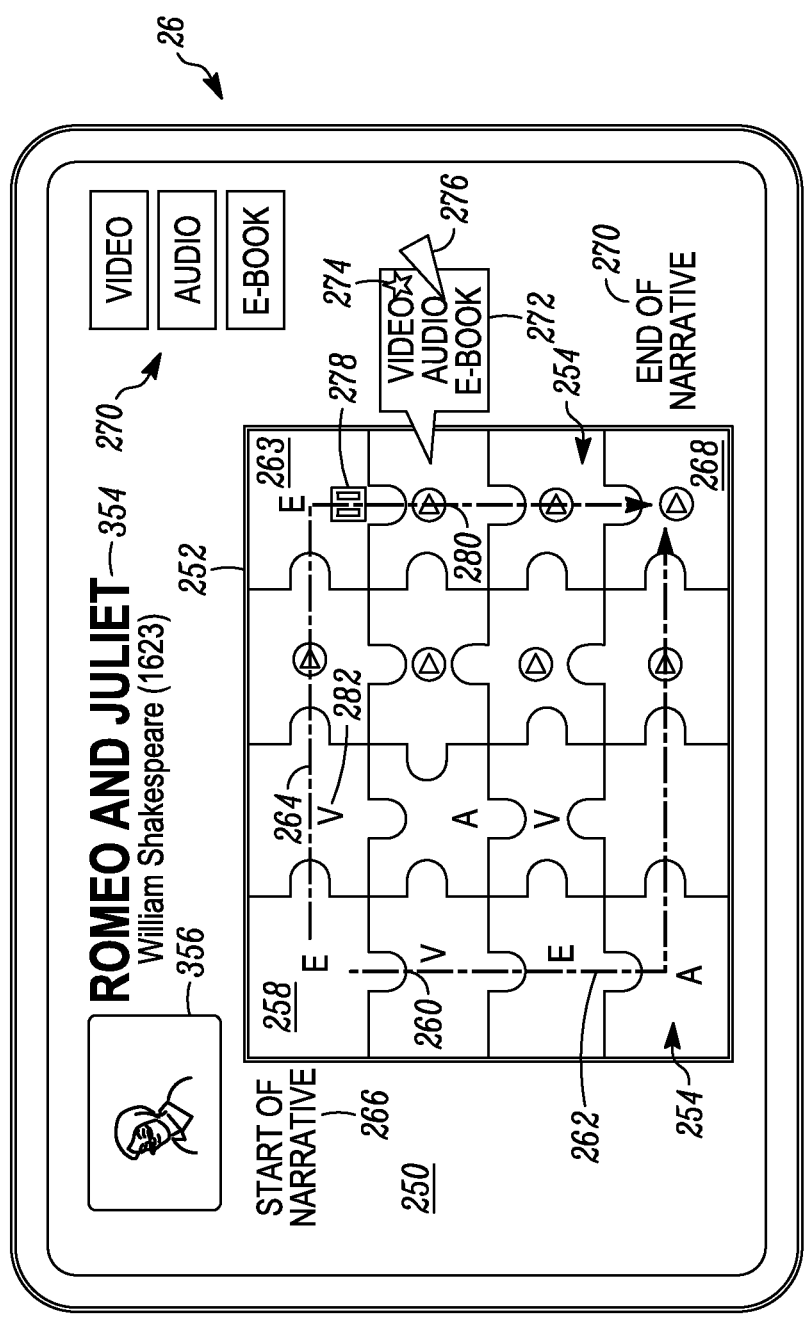
FIG. 6 is a front view a user's computing device displaying a second embodiment of an interactive user interface for a mixed medium narrative presentation, in accordance with an embodiment.

Referring to FIG. 6, in a second embodiment of a novel user interface 250 for mixed media narrative presentation on a user's computing device 26, the user can choose between an ordered presentation of narrative segments and a random presentation of segments. The user interface 250 enhances the user's experience by representing the narrative presentation as a game where the narrative is represented by an area of the interface 252 and each segment of the narrative is represented by a graphic 254, for example, a graphic puzzle piece. The individual puzzle pieces, for example, puzzle piece 258 are arranged to indicate a relationship of the corresponding segment with the segments represented by neighboring pieces. For example, a protruding lobe 260 on a puzzle piece might indicate a direction in which the segments of a narrative proceed. The user may be able to choose from multiple plotlines 262, 264 for a narrative by selecting a puzzle piece having plural lobes indicating a progression of the narrative to either of plural segments represented by respective adjoining puzzle pieces.

The user may elect to have the narrative presented as an ordered succession of segments by selecting puzzle pieces corresponding to one of the possible plotlines and then selecting the area of the interface denoted by the "Start of Narrative" legend 266 with a pointer or other selection mechanism available on the user's computing device. The computing device will then select an ordered progression of the narrative segments, each represented by an adjacent puzzle piece, ending with the segment 268 adjacent to the "End of Narrative" legend 270 or the last segment selected by the user.

On the other hand, the segments of the requested narrative may be presented in a random manner by selecting an individual puzzle piece 254, for example, the piece 263. Selected segments of the narrative will obtained from the mixed media presentation memory 32 and transmitted to the user's computing device for presentation.

The available media for presenting the next segment of an ordered presentation of a narrative or a selected segment of a narrative may be indicated to the user by either a media selection area of the interface displaying controls 270 enabling selection of one of the mediums available for presentation of the segment or by pop-up menu 272 which appears when the user engages a respective puzzle piece with a pointing device. The pop-up menu 272 may include an indicator 274 of a preferred medium for the segment based on the medium selected for adjacent segments or a prior selection by the user or selection by a group of users or otherwise. When the interface indicates that plural media are available for presentation of a segment, the user may select a preferred medium by selecting one of the available media 276. The identity of the preferred medium is transmitted to the data processing unit 28 of the mixed media presentation system 22 which recovers the segment in the designated medium from the mixed media presentation memory 32 and transmits the segment to the user's computing device 26 for presentation. A progress icon 278 displayed on the interface indicates which segment is currently being presented and may include an indication 279 of the state of completion of the segment's presentation. A presentation control icon 280 enables selective control of the progression of the narrative presentation and indicates whether the presentation is proceeding or, as illustrated, has been halted by the user. As each segment is presented, a label 282 is superimposed on the corresponding puzzle piece indicating the medium in which that segment of the narrative was presented.

Figure 13:
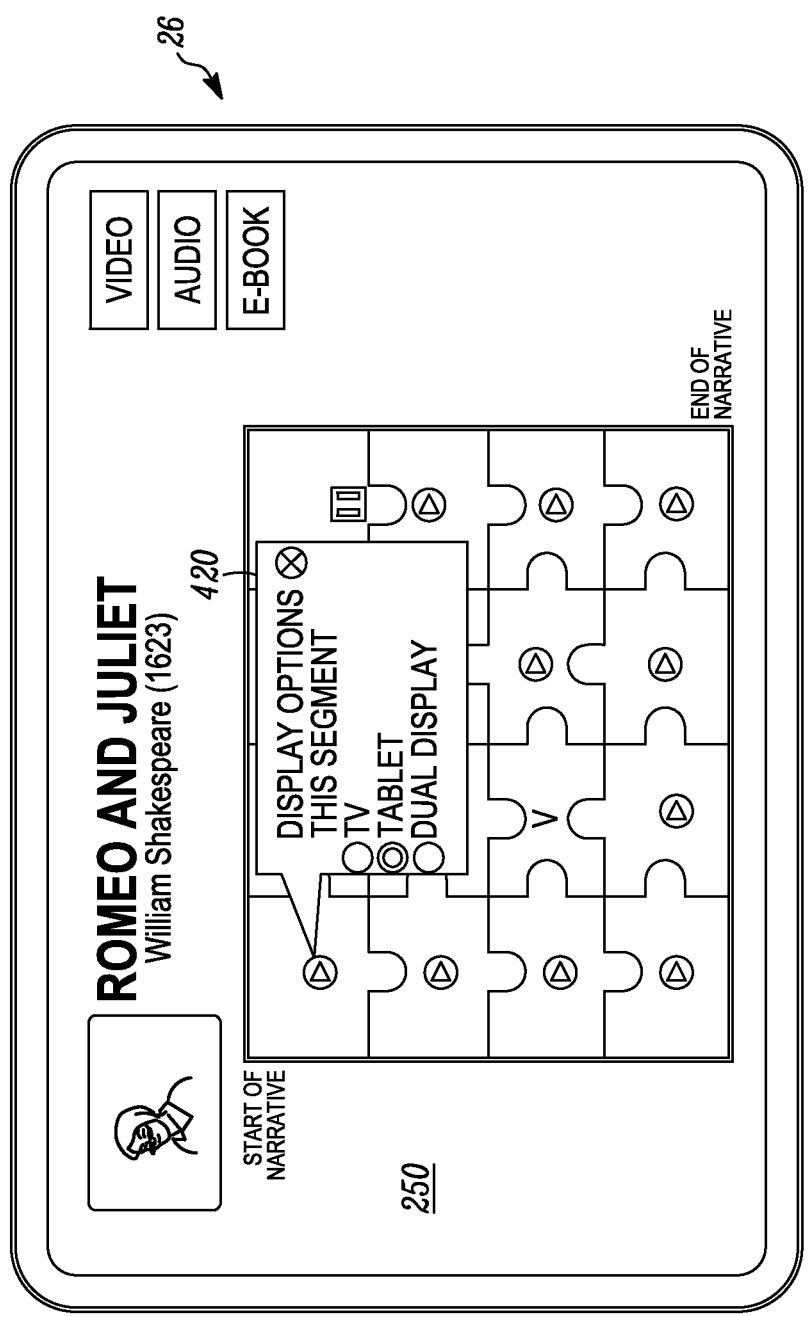
FIG. 13 is an exemplary interface for a computing device enabling selection of devices for presentation of a narrative segment, in accordance with an embodiment.

Referring also to FIG. 13, the interface 250 may include controls 420 enabling the user to select particular computing devices for presentation of a segment or for simultaneous presentation of plural media expressions of a segment on differing devices, such as displaying an image on a tablet computer and a corresponding audio segment on an MP3 player.

Figure 14:
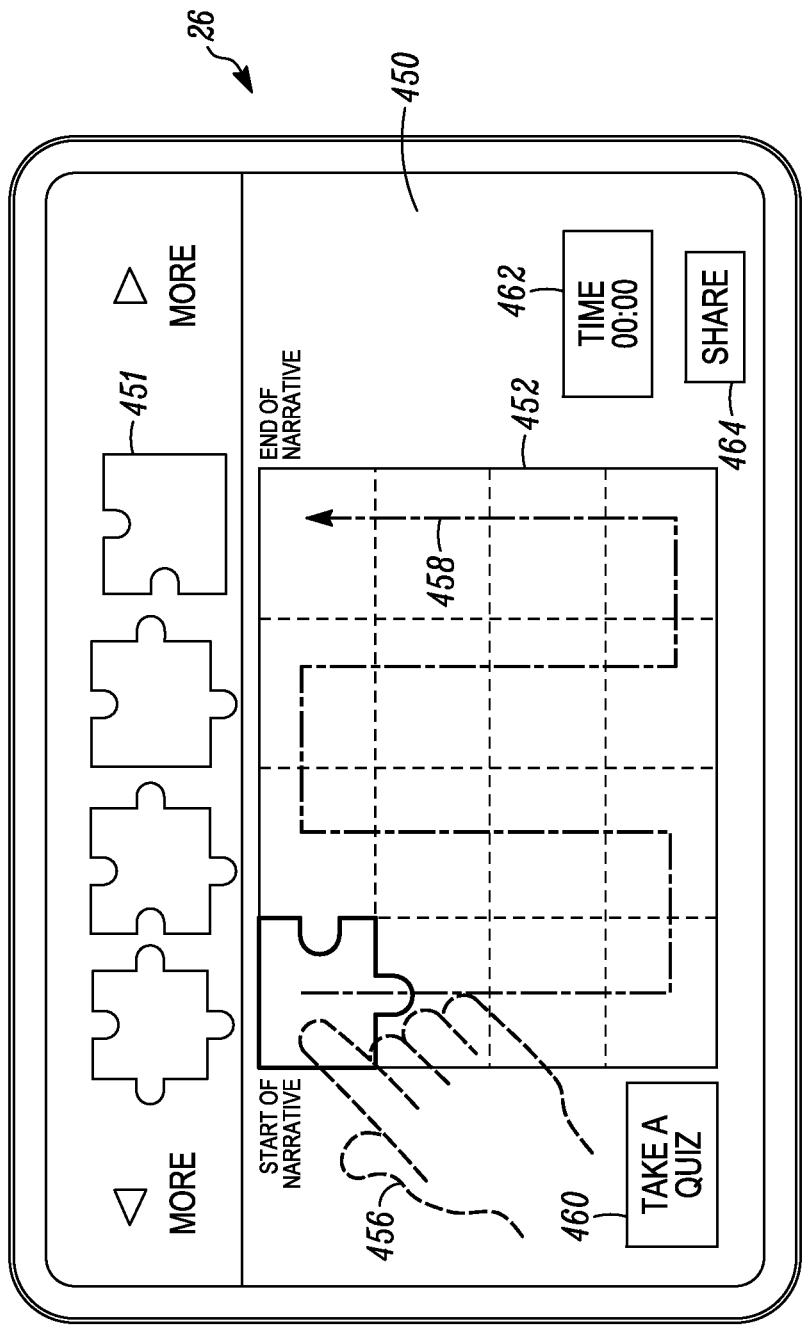
FIG. 14 is an exemplary interface for a computing device for presenting a mixed media narrative as a game, in accordance with an embodiment.

To further enhance the user's experience, a user interface enabling a user to select narrative segments in a game where the user may compete against a clock to fit the segments into a complete narrative may be presented on the user's computing device 26. Referring also to FIG. 14, for example, a user interface 450 may display a skeleton 452 for a puzzle and a number of puzzle pieces 454 each representing a segment of the narrative. The user 456 can select and move a puzzle piece and place the selected piece on the skeleton 452 to complete a narrative piece-by-piece following a plotline representation 458 on the skeleton. On the other hand, the user may be encouraged to guess what comes next in a narrative by selecting puzzle pieces that fit adjoining pieces without any indication of a progression of a plot. When the puzzle is completed the user can activate presentation of the narrative that the user has constructed by selecting the "start of narrative" area of the interface. The user interface also times 462 the completion of the puzzle to provide a measurement of the user's performance and enables the user to share the experience with others through a social media interface control 464. The user interface 450 also includes a control 460 enabling the user to respond to questions about the narrative and score his/her understanding of the subject and, while the mixed media narrative presentation system may be used for entertainment, it may also be used to enhance a user's experience during other activities, such as education or mixed media news presentations.

The mixed media narrative presentation system enables a user to select and mix the mediums in which segments of a narrative are presented.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. An electronic apparatus for presenting a mixed media narrative, said electronic apparatus comprising:
    a memory configured to store computer-readable instructions and data associated with a narrative, wherein the narrative is available in multiple mediums of expression, and the stored data includes at least:
        a plurality of segments of a first medium of expression of the narrative;
        a plurality of segments of a second medium of expression of the narrative; and
        mapping data linking respective segments of the multiple mediums of expression of the narrative, wherein the mapping data indicates which particular segments of the first medium of expression and corresponding segments of the second medium of expression are substitutable for each other; and
    a processor configured to access the stored data associated with the narrative and execute the computer-readable instructions to:
        receive a request for presenting the narrative from a computing device of a user;
        present an interactive graphical user interface (GUI) to the user via a display of the computing device in response to the request, wherein the interactive GUI is generated based on the data associated with the narrative that is stored in the memory, and the interactive GUI enables the user to monitor and control progress of presenting the narrative and to select different mediums of expression for presenting respective segments of the multiple mediums of expression of the narrative,
            wherein the interactive GUI includes a media selector indicating a plurality of media presentation options for presenting the narrative, wherein the plurality of media presentation options include the first medium of expression and the second medium of expression of the narrative, and the media selector enables interchanging of the respective segments of the multiple mediums of expression of the narrative that are substitutable for each other by the user;
        receive a first user input from the computing device of the user, wherein the first user input indicates a preferred medium of expression of the narrative that is selected by the user from among the plurality of media presentation options via the media selector of the interactive GUI, wherein the preferred medium of expression is one of the first medium of expression and the second medium of expression;
        transmit a first segment of the preferred medium of expression of the narrative to the computing device of the user in response to the first user input;
        receive a second user input from the computing device of the user, wherein the second user input indicates a new medium of expression of the narrative that is selected by the user from among the plurality of media presentation options via the media selector of the interactive GUI, wherein the new medium of expression is a different one of the first medium of expression and the second medium of expression from the preferred medium of expression;
        identify any segments of the new medium of expression of the narrative that are substitutable for the first segment of the preferred medium of expression or a second segment of the preferred medium of expression based on the mapping data stored in the memory in response to the second user input; and
        transmit one of a first segment of the new medium of expression that is identified as being substitutable for the first segment of the preferred medium of expression and a second segment of the new medium of expression that is identified as being substitutable for the second segment of the preferred medium of expression to the computing device of the user.

2. The electronic apparatus of claim 1, wherein the processor is further configured to execute the computer-readable instructions to:
    define the plurality of segments of the first medium of expression of the narrative and associate metadata with each segment identifying and describing the segment of the first medium of expression, and define the plurality of segments of the second medium of expression of the narrative;
    analyze the respective segments of the multiple mediums of expression of the narrative, wherein the analyzing includes comparing the plurality of segments of the first medium of expression of the narrative and associated metadata to the plurality of segments of the second medium of expression of the narrative and associated metadata, and determining which particular segments of the first medium of expression and corresponding segments of the second medium of expression are substitutable for each other; and
    associate a first mapping datum with a segment of the second medium of expression if a segment of the first medium of expression is substitutable for the segment of the second medium of expression.

3. The electronic apparatus of claim 1, wherein the processor is further configured to execute the computer-readable instructions to:
    analyze the respective segments of the multiple mediums of expression of the narrative, wherein the analyzing includes comparing the plurality of segments of the first medium of expression of the narrative to the plurality of segments of the second medium of expression of the narrative, and determining which particular segments of the first medium of expression and corresponding segments of the second medium of expression are substitutable for each other; and associate a first mapping datum with a first segment of the second medium of expression that is presentable sequentially before a second segment of the second medium of expression if a segment of the first medium of expression is substitutable for the first segment of the second medium of expression.

4. The electronic apparatus of claim 1, wherein:

the memory further stores a user profile that indicates a preference of the user for the preferred medium of expression of the narrative that is selected by the user;

the memory further stores a profile of a group of users that indicates preferences for different mediums of expression for presenting respective segments of the narrative expressed by members of the group of users that are associated with the user; and interactive GUI further presents a graphical representation to the user that indicates popularity of particular preferences expressed by members of the group of users based on the profile of the group of users associated with the user.

5. The electronic apparatus of claim 4, wherein:

the plurality of media presentation options include two or more of video, audio, text, e-book, movie, narrator audio only, e-book with movie scenes, narrator audio mixed with movie audio, and curated bundles, wherein the curated bundles are packages of respective segments of different mediums of expression of the narrative that have been bundled together according to the user profile or the profile of the group of users; and the first medium of expression and the second medium of expression are each different media presentation options among the plurality of media presentation options.

6. The electronic apparatus of claim 1, wherein:

the first segment of the preferred medium of expression of the narrative is currently being presented at the time of substitution;

the second segment of the preferred medium of expression is presentable sequentially after the first segment of the preferred medium of expression that is currently being presented; and the one of the first segment of the new medium of expression that is substitutable for the first segment of the preferred medium of expression and the second segment of the new medium of expression that is substitutable for the second segment of the preferred medium of expression is presented to the user sequentially after the first segment of the preferred medium of expression is presented, instead of the second segment of the preferred medium of expression, based on the substitution in response to the second user input.

7. The electronic apparatus of claim 1, wherein a segment of the first medium of expression is presented concurrently with a segment of the second medium of expression that are substitutable for each other in response to the second user input.

8. The electronic apparatus of claim 1, wherein the interactive GUI enables one or more of:

selection of any sequence of segments and different mediums of expression of the narrative by the user from among the multiple mediums of expression that are available for presenting the narrative to the user;

selection of specific groups or classes of segments within a specific medium of expression of the narrative that is selected by the user, including enabling the user to select or deselect individual persons, characters, speakers, actors, and combinations thereof;

selection of a specific device or combinations of specific devices by the user for presentation of respective segments of the different mediums of expression of the narrative to the user; and simultaneous presentation of respective segments of the different mediums of expression of the narrative that are substitutable for each other to the user via a single device or multiple devices selected by the user.

9. The electronic apparatus of claim 1, wherein the interactive GUI further includes a progress bar including a progress icon indicating the progress of presenting the narrative, wherein the progress bar identifies the different mediums of expression in which the respective segments of the narrative are presented to the user.

10. A method for presenting a mixed media narrative, the method comprising:

receiving a request for presenting a narrative from a computing device of a user, wherein the narrative is available in multiple mediums of expression;

presenting an interactive graphical user interface (GUI) to the user via a display of the computing device in response to the request, wherein the interactive GUI is generated based on data associated with the narrative that is stored in a memory, and the interactive GUI enables the user to monitor and control progress of presenting the narrative and to select different mediums of expression for presenting respective segments of the multiple mediums of expression of the narrative, wherein the stored data includes at least:

a plurality of segments of a first medium of expression of the narrative, a plurality of segments of a second medium of expression of the narrative, wherein the second medium of expression is different from the first medium of expression, and mapping data linking the respective segments of the multiple mediums of expression of the narrative, wherein the mapping data indicates which particular segments of the first medium of expression and corresponding segments of the second medium of expression are substitutable for each other, and wherein the interactive GUI includes a media selector indicating a plurality of media presentation options for presenting the narrative, wherein the plurality of media presentation options include the first medium of expression and the second medium of expression of the narrative, and the media selector enables interchanging of the respective segments of the multiple mediums of expression of the narrative that are substitutable for each other by the user;

receiving a first user input from the computing device of the user, wherein the first user input indicates a preferred medium of expression of the narrative that is selected by the user from among the plurality of media presentation options via the media selector of the interactive GUI, wherein the preferred medium of expression is one of the first medium of expression and the second medium of expression;

transmitting a first segment of the preferred medium of expression of the narrative to the computing device of the user in response to the first user input;

receiving a second user input from the computing device of the user, wherein the second user input indicates a new medium of expression of the narrative that is selected by the user from among the plurality of media presentation options via the media selector of the interactive GUI, wherein the new medium of expression is a different one of the first medium of expression and the second medium of expression from the preferred medium of expression;

identifying any segments of the new medium of expression of the narrative that are substitutable for the first segment of the preferred medium of expression or a second segment of the preferred medium of expression based on the mapping data stored in the memory in response to the second user input; and transmitting one of a first segment of the new medium of expression that is identified as being substitutable for the first segment of the preferred medium of expression and a second segment of the new medium of expression that is identified as being substitutable for the second segment of the preferred medium of expression to the computing device of the user.

11. The method of claim 10, further comprising:

defining the plurality of segments of the first medium of expression of the narrative, and associating metadata with each segment identifying and describing the segment of the first medium of expression; and defining the plurality of segments of the second medium of expression of the narrative, and associating metadata with each segment identifying and describing the segment of the second medium of expression.

12. The method of claim 11, further comprising:

analyzing the respective segments of the multiple mediums of expression of the narrative, wherein the analyzing includes:

comparing the plurality of segments of the first medium of expression and associated metadata to the plurality of segments of the second medium of expression and associated metadata, and determining which particular segments of the first medium of expression and corresponding segments of the second medium of expression are substitutable for each other; and generating the mapping data linking the respective segments of the multiple mediums of expression of the narrative that are determined to be substitutable for each other based on the analyzing.

13. The method of claim 10, wherein:

the memory further stores a user profile that indicates a preference of the user for the preferred medium of expression of the narrative that is selected by the user;

the memory further stores a profile of a group of users associated with the user that indicates preferences for different mediums of expression for presenting respective segments of the narrative; and the interactive GUI further presents a graphical representation to the user that indicates popularity of particular preferences expressed by members of the group of users based on the profile of the group of users associated with the user.

14. The method of claim 13, wherein:

the plurality of media presentation options include two or more of video, audio, text, e-book, movie, narrator audio only, e-book with movie scenes, narrator audio mixed with movie audio, and curated bundles, wherein the curated bundles are packages of respective segments of different mediums of expression of the narrative that have been bundled together according to the user profile or the profile of the group of users associated with the user; and the first medium of expression and the second medium of expression are each different media presentation options among the plurality of media presentation options.

15. The method of claim 10, wherein:

the first segment of the preferred medium of expression of the narrative is currently being presented to the user at the time of substitution;

the second segment of the preferred medium of expression of the narrative is presentable sequentially after the first segment of the preferred medium of expression; and the one of the first segment of the new medium of expression that is substitutable for the first segment of the preferred medium of expression and the second segment of the new medium of expression that is substitutable for the second segment of the preferred medium of expression is presented to the user sequentially after the first segment of the preferred medium of expression is presented, instead of the second segment of the preferred medium of expression, based on the substitution in response to the second user input.

16. The method of claim 10, wherein one of:

the first segment of the new medium of expression is presented to the user concurrently with the first segment of the preferred medium of expression based on the substitution in response to the second user input; or the second segment of the new medium of expression is presented to the user concurrently with the second segment of the preferred medium of expression sequentially after the first segment of the preferred medium of expression is presented based on the substitution in response to the second user input.

17. The method of claim 10, wherein the interactive GUI enables one or more of:

selection of any sequence of segments and different mediums of expression of the narrative by the user from among the multiple mediums of expression that are available for presenting the narrative to the user;

selection of specific groups or classes of segments within a specific medium of expression of the narrative that is selected by the user, including enabling the user to select or deselect individual persons, characters, speakers, actors, and combinations thereof;

selection of a specific device or combinations of specific devices by the user for presentation of respective segments of the different mediums of expression of the narrative to the user; and simultaneous presentation of respective segments of the different mediums of expression of the narrative that are substitutable for each other to the user via a single device or multiple devices selected by the user.

18. The method of claim 10, wherein the interactive GUI further includes a progress bar including a progress icon indicating the progress of presenting the narrative, wherein the progress bar identifies the different mediums of expression in which the respective segments of the narrative are presented to the user.

* * * * *